(12) United States Patent
Mendelsohn et al.

(10) Patent No.: US 6,208,039 B1
(45) Date of Patent: Mar. 27, 2001

(54) APPARATUS TO CONTROL MULTIPLE PARALLEL BATTERIES TO SHARE LOAD CURRENT

(75) Inventors: Aaron J. Mendelsohn, Campbell; Steven M. Canzano, Sunny Vale, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/375,871

(22) Filed: Aug. 17, 1999

(51) Int. Cl.$^7$ ...................................... H02J 1/10
(52) U.S. Cl. .............................. 307/52; 307/48
(58) Field of Search ................. 307/44, 48, 52, 307/69; 320/3, 6, 21, 61; 340/636, 660, 661

(56) References Cited

U.S. PATENT DOCUMENTS 3,956,638 * 5/1976 Ahrens et al. ........................ 307/48
3,987,352 * 10/1976 Hirota ..................................... 320/3
5,175,531 * 12/1992 Whitmire et al. .................... 340/636

* cited by examiner

*Primary Examiner*—Fritz Fleming
(74) *Attorney, Agent, or Firm*—Perman & Green, LLP

(57) ABSTRACT

Circuit apparatus for controlling a plurality of parallel connected batteries to equally share a common load is shown that includes an n parallel batteries connected to a common load element through a load current monitor that monitors the current through the load element, a battery current monitor for each battery, and a plurality of DC/DC converter circuits having outputs connected in series with each battery respectively. The load current output signal of the load current monitor is scaled down by 1/n, where n is the number of batteries, by a scale down amplifier circuit and distributed as a reference voltage to summing circuits where the scaled down load current is compared to the output of the battery current monitors. The outputs of the summing circuits are respectively connected as control signals to each of the DC/DC converters that are connected to each battery. Each DC/DC converter circuit adjusts it's output voltage to regulate the battery currents to $I_1 \ldots I_n$ of each of the n batteries to be equal to the reference voltage from the load current monitor.

4 Claims, 1 Drawing Sheet

APPARATUS TO CONTROL MULTIPLE PARALLEL BATTERIES TO SHARE LOAD CURRENT

BACKGROUND OF THE INVENTION

1. Field of the Invention

The present invention relates to apparatus for supplying electrical power, and more particularly to a method for reducing wear on a plurality of parallel connected batteries by controlling each battery to share a load element equally.

2. Prior Art

Prior techniques for connecting multiple parallel batteries included techniques for over-sizing the battery cell capacity to account for loss, or providing a relay and switch matrix to compensate for multiple battery cell failures. Such prior techniques are costly and inefficient.

SUMMARY OF THE INVENTION

An object of the present invention is to provide a highly efficient apparatus to reduce wear on a plurality of parallel connected batteries.

Another object of the present invention is to provide apparatus wherein each battery in a plurality of parallel connected batteries is controlled to share a load equally. Still another object of the present invention is to provide an apparatus for a plurality of parallel connected batteries that provides a high level of fault tolerance while minimizing the number of components.

Other and further features, advantages and benefits of the invention will become apparent in the following description taken in conjunction with the following drawing. It is to be understood that the foregoing general description and the following detailed description are exemplary and explanatory but are not to be restrictive of the invention. The accompanying drawing which is incorporated in and constitute a part of this invention and, together with the description, serves to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
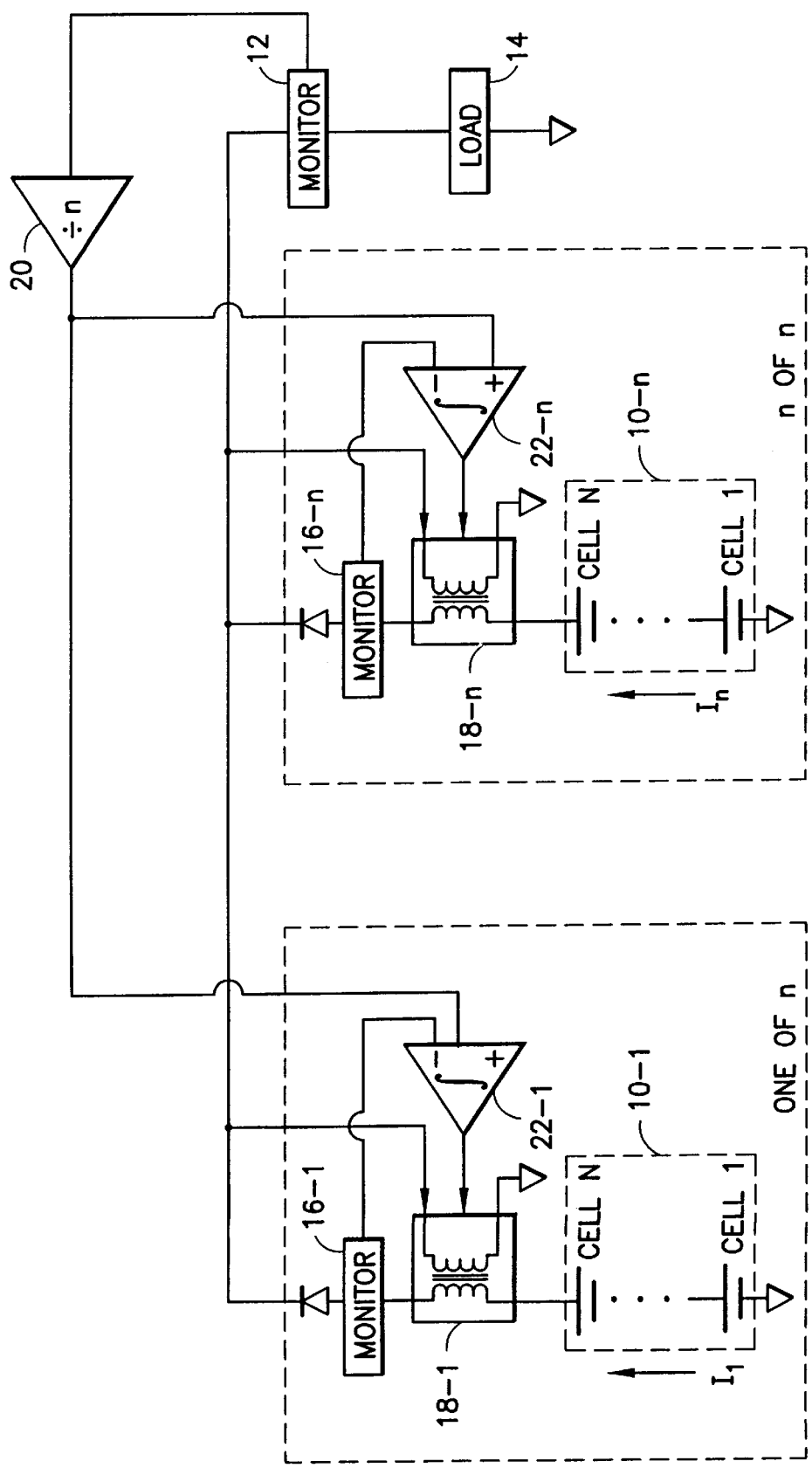
FIG. 1 is a schematic illustration of an embodiment of a circuit for carrying out the principles of the present invention.

Referring to FIG. 1, an embodiment of the present invention is shown that includes an architecture of n parallel batteries 10-1 . . . 10-n, each of which consist of N number of series connected battery cells where n and N may or may not be the same number. FIG. 1 also shows a load current monitor 12 that monitors the current through a load element 14, a battery current monitor 16-1 . . . 16-n for each battery, and n number of DC/DC converter circuits 18-1 . . . 18n having outputs connected in series with each battery 10-1 . . . 10-n respectively. Current sharing of the batteries is accomplished as follows: The load current output signal of the load current monitor 12 is scaled by 1/n, where n is the number of batteries, by a scale down amplifier circuit 20 and distributed as a reference voltage to summing circuits 22-1 . . . 22-n where the scaled down load current is compared to the output of the battery current monitors 16-1 . . . 16m. The outputs of the summing circuits 22-1 . . . 22-n are respectively connected as control signals to each of the DC/DC converters 18-1 . . . 18-n that are connected to each battery 10-1 . . . 10-n. Each DC/DC converter 18-1 . . . 18-n adjusts it's output voltage to regulate the battery currents I1 . . . In of each of the n batteries to be equal to the reference voltage from the load current monitor 12. The DC/DC converters 18-1 . . . 18-n are typically either n+1 redundant or primary/backup. Each of the DC/DC converter circuit's 18-1 . . . 18-n output voltage will typically be the difference between the bus voltage and the battery voltage. Thus, each of the batteries 10-1 . . . 10-n share the load element 14 equally. A secondary voltage loop can also be added to use the DC/DC converters 18-1 . . . 18n to regulate the bus voltage.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Apparatus for controlling a plurality of parallel connected batteries to share the load current of a common load element comprising:

a plurality of n batteries connected in parallel to a common load element;

a plurality of n DC/DC converter circuits, and a plurality of n battery current monitor circuits, one DC/DC converter circuit and one battery current monitor circuit connected in series with one of the n batteries;

a single load current monitor circuit connected in series between the outputs of the plurality of n battery current monitors and the load element to provide an output signal representative of the load current of the load element, the output signal of the load current monitor circuit being connected to each of the n DC/DC converter circuits and connected to a single scale amplifier circuit to scale down the output signal from the load current monitor wherein the scaled down load current output signal from the scale amplifier circuit is fed back and connected to each of the n DC/DC converter circuits;

a plurality of n summing circuits, each having a first input connected to the output of the scaling amplifier, and a second input connected to the output of a separate one of the n battery current monitor circuits wherein each summing circuit provides an output control signal, and wherein the output control signal from each of the n summing circuits is connected to a separate one of the n DC/DC converter circuits connected in series with each of the n batteries for controlling the battery current of each battery wherein each battery shares the load current.

2. The apparatus of claim 1 wherein each of the n batteries is comprised of N battery cells.

3. Apparatus for controlling a plurality of parallel connected batteries to share the load current of a common load element comprising:

a plurality of n batteries connected in parallel to a common load element;

a plurality of n DC/DC converter circuits, and a plurality of n battery current monitor circuits, one DC/DC converter circuit and one battery current monitor circuit connected in series with one of the n batteries;

a load current monitor circuit connected in series with the load element to provide an output signal representative of the load current of the load element, the output signal of the load current monitor circuit being connected to each of the n DC/DC converter circuits and connected to a scale amplifier circuit to scale down the output signal from the load current monitor;

a plurality of n summing circuits, each having a first input connected to the output of the scaling amplifier, and a second input connected to the output of a separate one of the n battery current monitor circuits wherein each summing circuit provides an output control signal, and wherein the output control signal from each of the n summing circuits is connected to a separate one of the n DC/DC converter circuits connected in series with each of the n batteries for controlling the battery current of each battery wherein each battery shares the load current;

wherein the scale amplifier circuit scales down the output signal from the load current monitor by a factor of n, where n is the number of batteries connected in parallel.

4. Apparatus for controlling a plurality of parallel connected batteries to share the load current of a common load element comprising:

a plurality of n batteries connected in parallel to a common load element;

a plurality of n DC/DC converter circuits, and a plurality of n battery current monitor circuits, one DC/DC converter circuit and one battery current monitor circuit connected in series with one of the n batteries;

a load current monitor circuit connected in series with the load element to provide an output signal representative of the load current of the load element, the output signal of the load current monitor circuit being connected to each of the n DC/DC converter circuits and connected to a scale amplifier circuit to scale down the output signal from the load current monitor;

a plurality of n summing circuits, each having a first input connected to the output of the scaling amplifier, and a second input connected to the output of a separate one of the n battery current monitor circuits wherein each summing circuit provides an output control signal, and wherein the output control signal from each of the n summing circuits is connected to a separate one of the n DC/DC converter circuits connected in series with each of the n batteries for controlling the battery current of each battery wherein each battery shares the load current;

wherein each DC/DC converter circuit is responsive to the output signal of the summing circuit connected thereto to adjust its output voltage to be equal to the reference voltage from the load current monitor by regulating the current through the battery connected in series therewith.

* * * * *